United States Patent [19]
Ishii

[11] 3,874,128
[45] Apr. 1, 1975

[54] CENTERLESS WORK-HOLDING APPARATUS FOR A MACHINE TOOL

[75] Inventor: Katsutoshi Ishii, Ichikawa, Japan

[73] Assignee: Seiko Seiki Kabushiki Kaisha, Tokyo, Japan

[22] Filed: Nov. 30, 1972

[21] Appl. No.: 310,780

[30] Foreign Application Priority Data
Nov. 30, 1971 Japan.............................. 46-112448
Nov. 30, 1971 Japan.............................. 46-112447

[52] U.S. Cl. ................................................. 51/236
[51] Int. Cl............................................. B24b 41/06
[58] Field of Search ....................................... 51/236

[56] References Cited
UNITED STATES PATENTS
| | | | |
|---|---|---|---|
| 2,715,304 | 8/1955 | Dix ........................................ | 51/236 |
| 3,023,552 | 3/1962 | Grobey et al. ........................ | 51/236 |
| 3,056,238 | 10/1962 | Hahn ..................................... | 51/236 |
| 3,158,970 | 12/1964 | Lockwood ............................ | 51/236 |
| 3,746,523 | 7/1973 | Johansson............................. | 51/236 |

Primary Examiner—Al Lawrence Smith
Assistant Examiner—James G. Smith
Attorney, Agent, or Firm—Robert E. Burns; Emmanuel J. Lobato; Bruce L. Adams

[57] ABSTRACT

A centerless work-holding apparatus or fixture for a machine tool for holding work in a working position radially and axially relative to a reference axis with work-driving by use of rolls and an axially and rotatably movable rotor element which is fluid-actuated for releasably clamping the workpieces during work thereon. The rotor element has a flange which provides areas on opposite sides thereof for actuating it with fluid under pressure. These areas are individually greater than the profile area or transverse dimensional area of the workpieces so that very small workpieces can be individually held by the pressure of the fluid actuating the rotor element.

3 Claims, 6 Drawing Figures

CENTERLESS WORK-HOLDING APPARATUS FOR A MACHINE TOOL

BACKGROUND OF THE INVENTION

This invention relates generally to machine tools and more particularly to a centerless work-holding apparatus for internal grinding machines.

Conventional centerless grinding machines are known in which a set of two driving rolls and a shoe support workpieces on the peripheral surface thereof and maintain them in a work position for performing grinding or other operations thereon. Some of these known machine tools have fluid discharge ports facing an end surface of the workpiece from which a fluid, for example a hydraulic fluid, is ejected and applied against the workpiece applying axial pressure against the workpiece thereby holding it against a fixed plate maintaining the position of the workpiece for working thereon. However, the direct application of a hydraulic fluid to maintain the workpiece in position has limitations in that this technique is not readily applicable to extremely small surface areas on some workpieces such as miniature ball bearings. The force applied on the workpiece in such circumstances in such that the biasing or holding force is insufficient so that the machine operations, for example grinding, cannot be accurately carried out. It has generally been found that in order to maintain direct fluid pressure on a workpiece the hydraulic force must be in the order of a relatively high pressure, for example 30 to 50 kg/cm$^2$.

In one construction of a conventional centerless grinder a roll skew is used in which two rolls and a shoe hold the workpiece. The axial holding force applied to the workpiece is accomplished by skewing one of the rolls. Each of the rolls contacts the workpiece at a respective point but the driving force applied by this type of work-holding apparatus is thereby decreased, and therefore the workpiece cannot be subjected to a heavy grinding operation. Moreover, the roll skewed needs to be adjusted to obtain a stable axial holding force. In these devices, the workpiece is held in reference bot to its outer diameter, but to an end surface, so that if the end surface of a tubular workpiece is not finished-ground with an accurate surface, which is exactly at right angles relative to the workpiece axis, the bore of a tubular workpiece will be ground with a taper.

In other machine tools for centerless grinding, a magnetic work-holding device is used. However, in such a case the workpieces are subjected to magnetization and must be subjected to a demagnetizing operation after grinding. Futhermore, the grinding chips adhere to the apparatus by virtue of the magnetization thereof so that the machine is subject to scoring and excessive wear. Another limitation of this type of apparatus is that the workpieces themselves must have good magnetic characteristics and workpieces of poor magnetic characteristics are not readily held, for example stainless steel. When very small workpieces, for example tubular workpieces having a bore diameter smaller than 10 millimeters, are to be ground internally, the effective area of the workpieces cooperating with the magnet are very small so that it is difficult to hold the workpieces in the right position and the grinding accuracy accordingly is decreased.

SUMMARY OF THE INVENTION

It is a principal object of the present invention to provide a centerless work-holding apparatus for machine tools making possible to machine or grind extremely small workpieces precisely and with strongly applied machining or grinding forces.

Another object of the present invention is to provide a centerless work-holding apparatus having an automatic bore plug gage to gage and size the inner diameter of the bore of workpieces in wich internal machining or grinding operations are effected.

Still another object of the present invention is to provide a centerless work-holding apparatus in which workpieces are accurately held and a hydraulic liquid or some other fluid is used for applying an axial holding force by means of a pressure-applying rotor. The fluid, if it is a hydraulic fluid, is likewise used as a coolant and is applied without impeding the gaging operation.

Another object of the present invention is to provide a hydraulic fluid system in which a low pressure pump flows the hydraulic cooling fluid and chips therein to a filter which may be constructed inexpensively and a high-pressure pump is used to boost the fluid pressure downstream of the filter.

A centerless work-holding apparatus according to the invention has a front plate defining a surface facing an end of individual, tubular workpieces against which each workpiece is abutted by a pressure-applying rotor which is rotatably and slidably supported in a cylinder for holding the workpieces between it and said surface while they are rotatably driven and radially positioned by driven rolls. The axial pressure applied by the rotor element and the radial force applied by the rolls and a shoe maintains the individual workpieces in a working position accurately held therein in position for internal grinding operations.

The pressure-applying rotor is housed in a cylinder which is large enough for hydraulic fluid to flow adequately therethrough to function as a coolant to the workpieces while an adequate pressure is applied to an end flange on the rotor and it is applied against the individual workpieces to hold them stably and firmly in its axial position during the rotation of the rotor in conjunction with the rotating individual workpieces. Moreover, the liquid pressure in the flow path increases or decreases in response to axial movement of a plug gage gaging of the internal bore of the workpieces but in no way impedes the gaging operation and the pressure applied to the workpiece is maintained accurately.

The abrasive grains or chips of material removed during a machining or grinding operation are carried out of the work-holding apparatus by the coolant liquid at a low pressure and filtered through a low-pressure filter. The coolant pressure is boosted on the discharge side of the filter with a high-pressure pump which supplies the pressure necessary to operate the pressure-applying rotor reciprocably for selectively clamping and releasing the workpieces individually. The low pressure filter accordingly can be constructed in an inexpensive manner and its operating life is increased since it is not subjected to high pressures.

Figure 1:
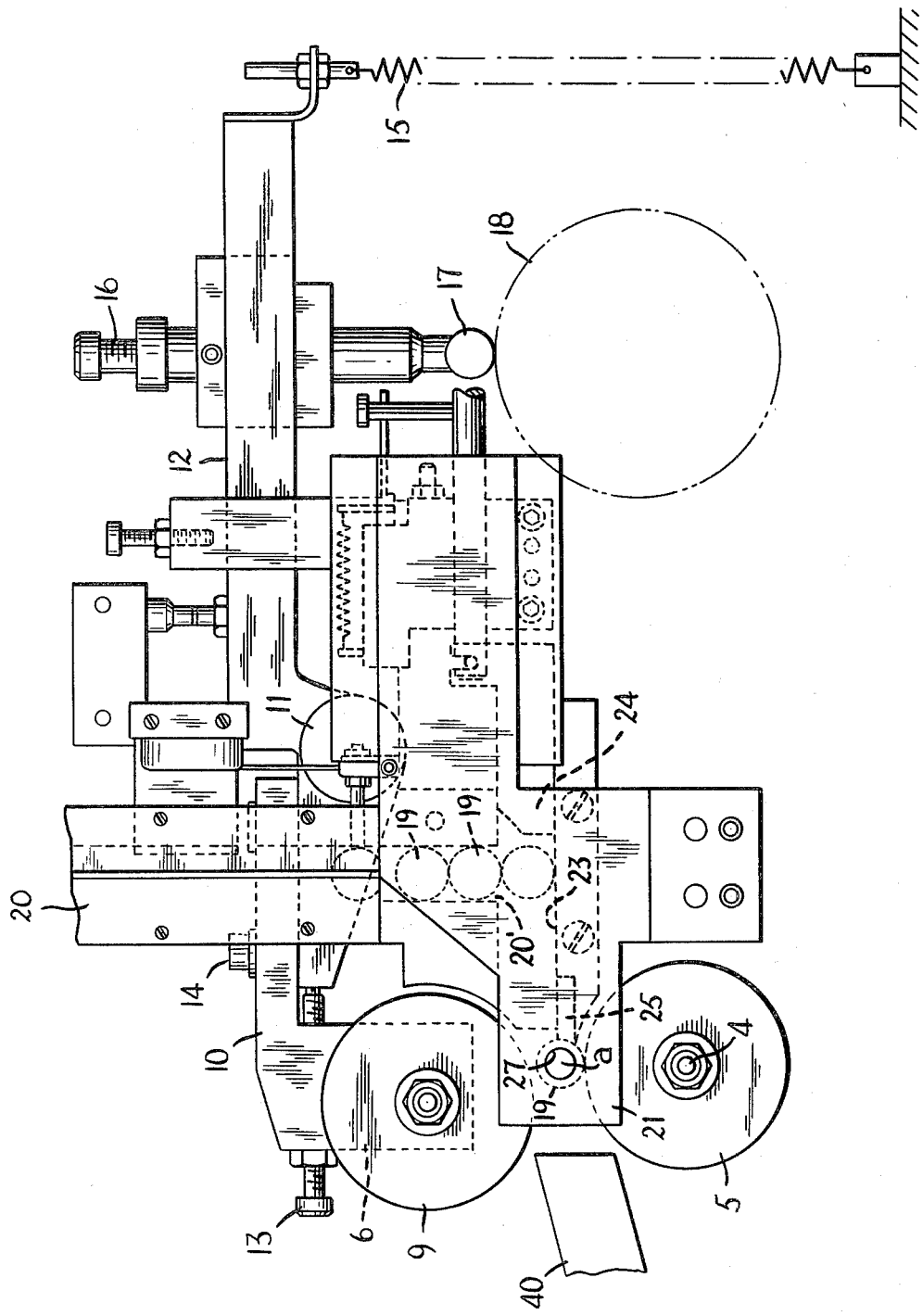
FIG. 1 is a schematic side elevation view of a centerless work-holding apparatus according to the invention.
Figure 2:
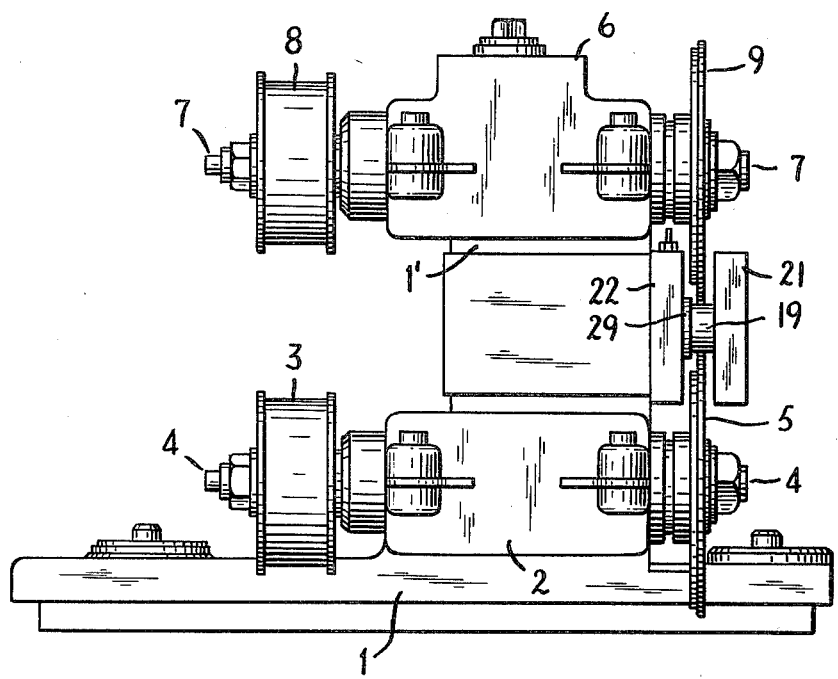
FIG. 2 is a front elevation view of the centerless work-holding apparatus in FIG. 1.
Figure 3:
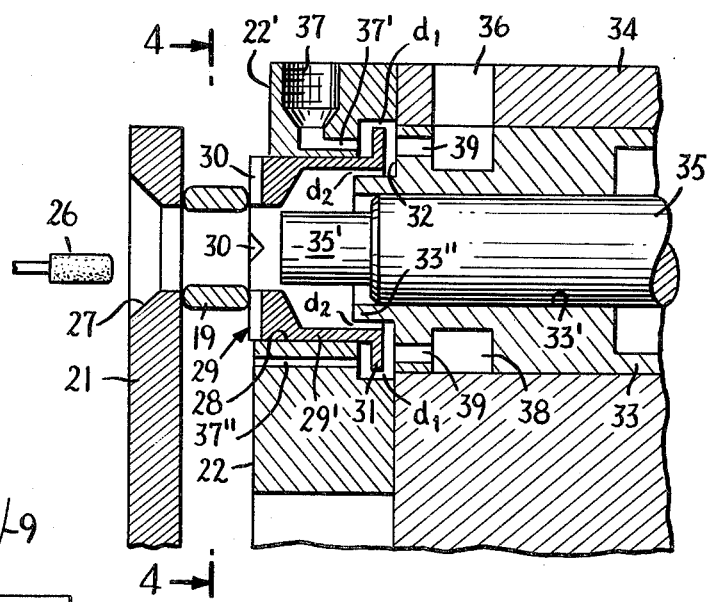
FIG. 3 is a fragmentary sectional view of a centerless work-holding apparatus in FIG. 1.

Other objects and advantages will appear from the following description of an example of the invention and the novel features will be particularly pointed out in the appended claims.

DESCRIPTION OF THE PREFERRED EMBODIMENTS

As illustrated in the drawings, a centerless work-holding apparatus according to the invention comprises a base 1 on which is mounted a block 2 rotatably supporting a driven-shaft pulley 3 fixed on a rotatable shaft 4 extending through the block 2. A lower driving roll 5 is mounted on the shaft 4 for rotation therewith. A second block 6 supported as hereinafter described supports a rotatably driven shaft 7 provided with a driven-shaft pulley 8. The shaft 7 is likewise provided with an upper driving roll 9 for driving a workpiece as hereinafter described. The upper block 6 is provided with an arm 10 pivotal about a pivot pin 11, on the portion 1', about which a lever 12 supporting the block 6 and its arm rocks. An adjustment screw 13 extends through the upper block 6 and provides an adjustment of the upper roll 9, for variable sizes of workpieces, by adjusting the support arm 10 relative to the support lever 12. Once a proper adjustment is set for a particular size workpiece, the upper block is secured in position on the rocker arm 12 by a set screw 14.

The rocker arm 12 is biased in a clockwise direction by a biasing spring 15, which provides for cyclical adjustment of the position of the driving roll 9 in accordance with the size of the workpieces to be handled, and for the receiving of individual workpieces when work is to be performed thereon. The position of the roll is adjusted by adjusting the angular position of the rocker or swing lever 12 by an adjustment device 16 extending through the arm and supporting on one end thereof a cam follower 17 that engages the profile of a rotatably driven control cam 18 so that the upper roll 9 is biased counterclockwise against the action of its spring.

The centerless work-holding apparatus according to the invention is usable with various type workpieces and machine tools and is illustrated as applied to a grinding machine and being used with tubular workpieces 19 having an axial bore in which an internal grinding operation is performed as hereinafter described. The workpieces 19 are delivered to the apparatus through a hopper or chute 20. The workpieces are intended to be rotatably driven by the driving rolls 5, 9 described above, and releasably held axially in position against a face plate 21 and between the face plate 21 and the holder plate 22 provided with a guideway 23 in communication with the lower end 20' of the chute 20. To enter the guideway from the chute, for delivery to a work position a between the lower and upper rolls 5, 9 the workpieces are positioned individually in this position by a loading or feed blade 24, which is actuated reciprocably, by means not shown, in syncronization with the upward and downward movement of the upper roll 9 under control of the control cam. The cam spaces the upper roll from the lower roll as shown in FIG. 1 when a workpiece is being loaded in the work position and then lowers the upper roll for engagement with the workpiece.

When the individual workpieces are delivered individually by the injector or feed 24, they are held against a shoe or stop 25. The two rollers are driven in directions effective to cause the individual workpieces 19 to bear against the stop or shoe 25. The individual workpieces are therefore rotatably driven and are held in accurate radial position since they bear against the two driving rolls and a third point or area defined by the shoe 25.

The workpieces in the apparatus illustrated are ground internally by a grinder 26 inserted axially, in synchronism with the positioning of the individual workpieces and by means not shown, through an opening 27 in the face plate 21 coaxial with the bore of the individaul workpieces. A cylinder or bore 28 is formed in the plate 22 in which is housed a pressure-applying rotor 29 which is rotatable and axially displaceable within the cylinder or bore 28 and is movable axially by fluid under pressure for engaging an end of the individual workpieces for applying axial pressure thereto to maintain them releasably clamped and aligned coaxially with the opening 27 in the face plate and the cylinder or bore in the oppositely disposed plate 22 in which the rotor is housed.

The pressure-applying rotor 29 is constructed with a cylindrical portion 29' and oppositely disposed flanges at opposite ends. A flange at one end extends inwardly and is provided with radial, fluid passages 30. The other flange 31 extends outwardly as indicated. The cylinder or base 28 has a major and a minor diameter and the outwardly-extending flange 31 extends into the major bore portion of the cylinder. A shoulder defines a pressure chamber or space 32 formed by a bushing 33, a block 34, and the plate 22. The bushing 33 is a guide bushing in which is axially guided a reciprocally driven bore gage constructed as a plug gage 35 for gaging the internal bore of the individual workpieces as hereinafter described. This gage is rotatably and slidably mounted in the axial bore 33' of the guide bushing to make possible direct sizing of the workpiece by insertion of a tip or gage part 35'.

The block 34 is provided with a fluid inlet 36 and and outlet 37 having a passageway 37' in communication with the pressure space or chamber 32. The inlet 36 is in communication with an annular groove or passageway 38 in the guide bushing in communicatin with the pressure chamber 32 through an annular port or passage 39. Fluid under pressure, for example a hydraulic fluid, is applied to the inlet and flows through the cylinder compartment or pressure chamber 32 through the supply port or passage 39 in the guide bushing in communication with the annular passageway of the guide bushing.

Figure 4:
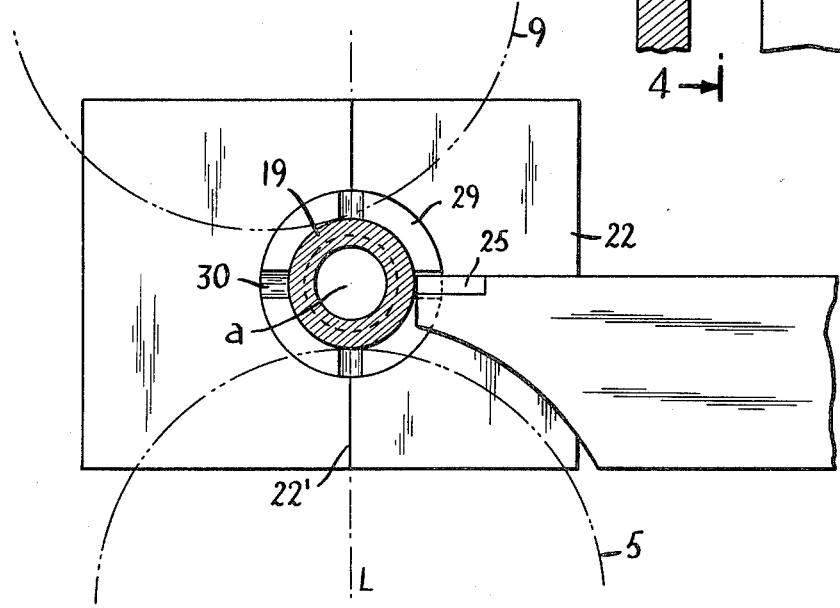
FIG. 4 is a section view taken along section line 4—4 in FIG. 3.

As shwon in FIG. 4, the pressure holder plate 22 has a stepped portion 22' with a higher part on the right hand side and a lower part on the left hand side of the centering vertical axis L normal to the axis of the workpiece grinding position a. The pressure chamber 32 and the end flange 31 are dimensioned so that the oil flow control clearance $d1$ is less than a second clearance $d2$. These are dimensioned to carry out operation as later described for flowing fluid under pressure for: actuating the pressure-applying rotor out of the ports or passages 30 open to the exterior of the apparatus from the compartment cylinder pressure chamber 32 as further described hereinafter.

The workpieces 19 are transferred from the chute 20 and the injector or feed 24, as before described, positions them individually in the grinding position *a* between the upper and lower driving rolls 5, 9. The upper roll 9 is urged to engage with the periphery of the workpiece through the driven control cam 18 which controls the movement upwardly and downwardly of the upper roll. The individual workpieces are held firmly at three points by the driving rolls 5, 9 and the stop or shoe 25. As before described, the two driving rolls rotate in a selected direction, by drive means not shown, applying rotation to the drive pulleys. The individual workpieces 19 are rotated in a clockwise direction by the rolls, and each is pushed against the stop or shoe 25.

When the pressurized fluid is applied to the cylinder pressure chamber 32 through the passage 38 and the port 39 from the inlet 36, a hydrostatic pressure is generated in the pressure chamber 32 and pressure is applied to the flange or pressure-receiving flange portion 31 of the pressure-applying rotor 29 so that it moves forwardly, outwardly of the cylinder, to the left in the drawing, to engage an end of the individual workpiece 19 in the working position *a*. The individual workpiece has applied thereto a strong axial clamping force so that it bears against the front plate 21 and is held releasably clamped in position accurately axially and radially and cannot move relative to a reference axis coaxial with its own axis and the rotor axis and the aperture in the face plate.

Drive means are provided for positioning the grinding wheel or grinder 26 in position through the aperture or hole 27 of the front plate 21 to grind the inner surface of the workpiece 19. This is done in synchronism and timed relationship with the other operations, by means not shown.

Pressurized fluid, for example a hydraulic fluid, is applied through the inlet 36 to the pressure chamber 32 and provides an axial force to the rotor 29, as before described. If a hydraulic fluid is used it functions to provide a grinding coolant maintaining the workpiece cooled and lubricated through the clearance $d_2$. Fluid under pressure is discharged from pressure chamber through the outlet 37 and the discharge port 37' and through the clearance $d_1$. The fluid also lubricates the rotor 29 for rotation in the cylinder 28.

When a specified grinding operation has taken place, the automatically-controlled bore gage 35 is advanced, by means not shown, axially so that its gaging portion 35' is inserted into the axial bore of the individual workpieces to perform direct sizing and the gaging. At the time that the gaging portion of the plug gage is inserted into the workpiece the axial bore is closed off by the plug gage but the radial passages 30 formed on the end flange of the rotor 29 provide an outlet so that the fluid confined in the rotor is discharged through these radial passages and has no influence on the sizing or gaging of the individual workpieces.

When the workpiece is ground to a specified size, as determined by the gaging operations, the supply of pressurized oil to the inlet 36 is cut off by a control, not shown, and a reverse flow of hydraulic fluid under pressure from the outlet 37 to the pressure chamber 32, so that the pressure-applying rotor 29 is retracted and disengaged from the individual workpieces. Simultaneously, the upper driving roll 9 releases the workpiece under control of the control cam so that the finished workpiece is discharged through a chute 40 by the next workpiece entering the working position delivered as before described. The above operations are repeated cyclically and in synchronization, so that the individual workpirces can be continuously ground, sized or gaged, automatically and inserted and discharged as before described.

Figure 5:
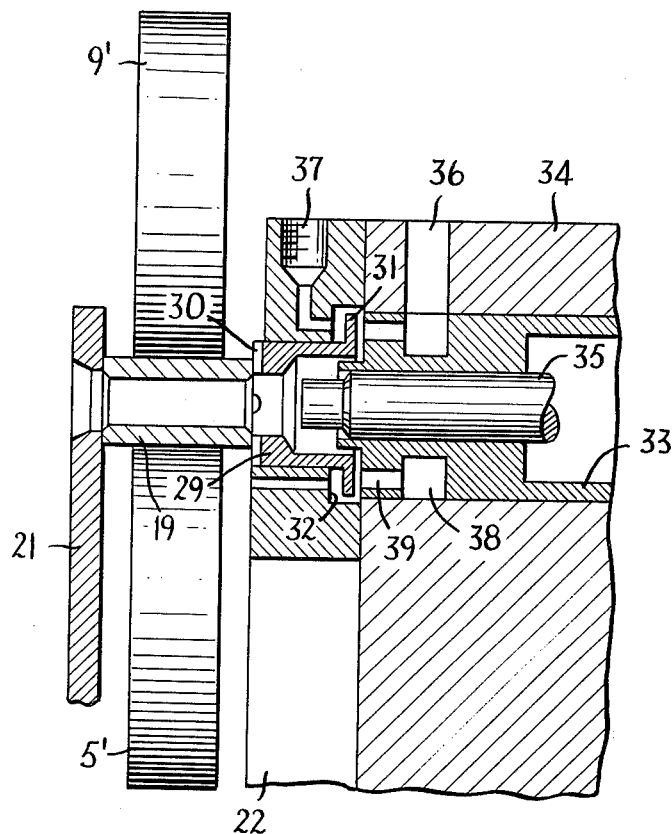
FIG. 5 is a fragmentary section view of a second embodiment of a centerless work-holding apparatus according to the invention.

The apparatus described above preferably operates in optimum condition if the opposite ends of the individual workpieces are ground accurately flat and normal to the longitudinal axis of the workpieces. In this manner, the individual workpieces are positioned accurately in their working position. Provision is made, however, in the apparatus according to the invention for accurately holding radially workpieces that are not accurately ground on the opposite end portions. This is accomplished by the apparatus illustrated in FIG. 5, in which the reference numerals employed therein correspond to the parts heretofore described of the first embodiment. In this second embodiment, different lower and upper driving rolls 5', 9', are provided. In this instance, the elongated tubular workpieces 19 are axially longer than the workpieces heretofore described. In this second embodiment, the driving-and-guide rolls 5', 9' are constructed of sufficient width so that they engaged a major axial length of the individual workpiece as illustrated in FIG. 5. The peripheral surface contacted is thus of a sufficient width or axial length that the radial position can be accurately maintained without the opposite ends of the workpieces being accurately ground. So long as the peripheral surface is thus sufficiently accurate, the driving rolls will maintain the longitudinal axis of the bores of the individual pieces coaxial with the various tools so that the internal grinding operation is carried out accurately as well as the gaging function as before described. The mode of operation of the second embodiment is otherwise similar to the apparatus heretofore described.

The grinding operations result in grains of material or chips from the grinding or machining operations which are carried off by the hydraulic coolant fluid. In the overall diagram illustrated in FIG. 6, a machine tool or grinding machine 41 is provided with a centerless work-holding apparatus of the type heretofore described. The hydraulic fluid used as a coolant is discharged from the grinding machine 41 to a hydraulic fluid tank 47 provided with a magnetic chip separator 48. A suction is taken on the rservoir or supply tank 47 by a low pressure pump 49 which delivers the hydraulic fluid to a filter 50.

The filter consists of an inexpensive paper and the filtered liquid is discharged through a valve A to the high pressure pump 51 which boosts the oil pressure, for example, up to 10 Kg/cm$^2$. The discharge of the high pressure pump 51 is connected through a set of directional control valves 52 and flow control valves 53a, 53b which are connected to the inlet 36 and outlet 37 respectively. The hydraulic fluid line between the high pressure pump 51 and the directional control valve 52 is provided with a relief valve 55 and a pressure gage 56.

The hydraulic fluid taken from the tank or reservoir 47 discharged through the filter 50 has all the residual abrasive grains and chip material removed therefrom in the fine or close filter. Since the filter 50 is disposed between the low pressure pump 49 and the high pressure pump 51, the differential pressure between the inlet and the outlet of the filter is maintained low so that it is possible to use an inexpensive filter construction, for example a paper filter, and the life of this filter is prolonged. Thus the use of a relatively low pressure to the filter makes it possible to use a system in which a pressure-proof or strong filter box is not necessary.

Figure 6:
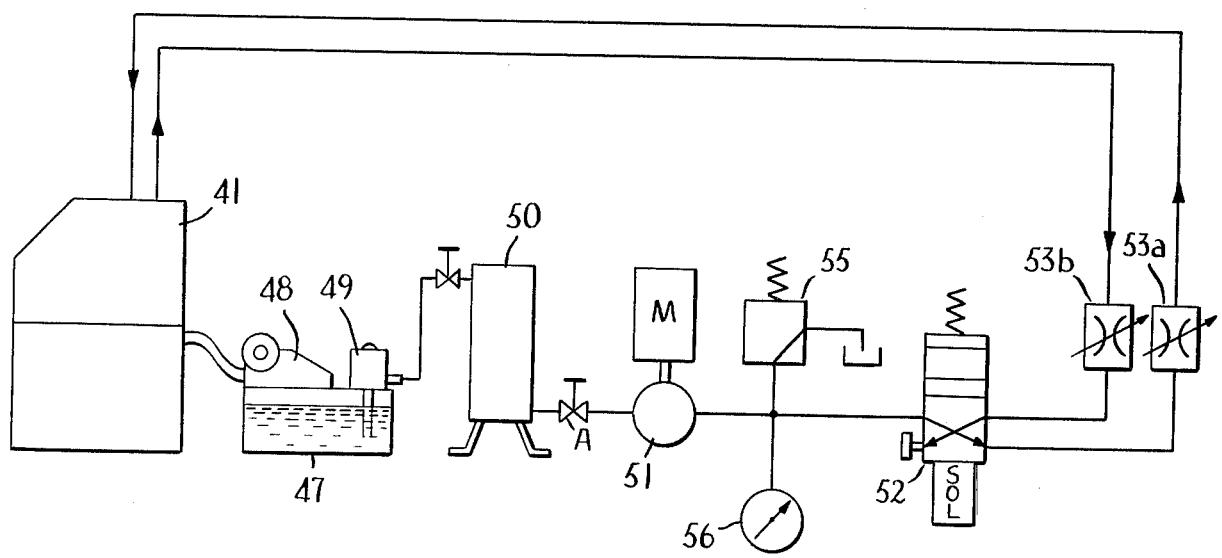
FIG. 6 is a schematic overall view of a hydraulic system used in conjunction with a centerless work-holding apparatus according to the invention.

In the illustration of the system in FIG. 6, the hydraulic fluid under pressure flows into the inlet 36 through the corresponding flow control valve 53a. The hydraulic fluid operates the work-applying holder or rotor as described above, and functions as a coolant and is returned to the supply or reservoir tank 47. The fluid from the outlet 37 returns through the flow control 53b and valve 52 into the reservoir 47. It is understood that the return line between the directional valve 52 and the reservoir or tank 47 is omitted in FIG. 6.

Those skilled in the art will recognize that in the apparatus described heretofore, two rolls and a stop or shoe radially position the workpieces. However, three rolls may be used instead.

In the apparatus according to the invention, the pressure-applying rotor is supported rotatably and slidably by the pressure holder plate and the workpiece is provided with an axial holding force that is readily accomplished so that the construction is simple to carry out the development of this force in comparison with the conventional hydrostatic and bearing methods. Moreover, the work-holding apparatus of the present invention makes it possible to grind workpieces having very small end surface areas for holding them axially in position. The power unit of the fluid pressure used in advancing and withdrawing of the pressure-applying rotor may be of a low pressure, for example, of 10 Kg/cm². If a hydraulic fluid is used for driving the rotor, it can be used both as the rotor motive power fluid and the coolant. However, the principles of the invention are applicable to the use of other fluids.

As indicated heretofore, the gaging or sizing operation is carried out automatically without impeding the flow of oil or the oil affecting the gaging operation.

Moreover, if the hydrostatic pressure applied to the pressure rotor is set properly, it is possible to grind workpieces not only with an end surface retaining method, or end surface method, but also with the peripheral surfaces so that a peripheral-reference method is possible for positioning of the workpieces. Thus accurate internal grinding can be performed even if both end surfaces of the workpieces are not finished as ground. Moreover, in case the workpieces are peripherally held with the peripheral reference method, it is possible to carry out heavy grinding or grind longer workpieces by enlarging the width of the two rolls, as before described, and strengthening the frictional rotational force against the workpieces.

As indicated heretofore, the ratios of the pressure-receiving areas, the fluid inlets and outlets, and the ports of the pressure space and clearances are maintained to effect rapid movement of the pressure-applying rotor. It is possible to move the pressure-applying rotor backwards and forwards rapidly and rotate it in conjunction with the driven workpieces, and the supply and discharge of workpieces is positively performed.

What I claim and desire to secure by Letters Patent is:

1. A centerless work-holding apparatus for a machine tool comprising, two rotatably driven rolls spaced radially to rotatably support individual workpieces sequentially disposed therebetween in a position radially relative to a reference axis passing through the individual workpieces and to engage the workpieces peripherally to rotatably drive them; means releasably clamping the workpieces individually in a position fixed axially of said reference axis and rotatably about said axis comprising a face plate disposed in a plane normal to said reference axis, a fluid-actuated, reciprocable, pressure-applying tubular rotor element actuated axially for engaging the workpieces individually and clamping them axially between it and the face plate; said rotor element having a flange at an end thereof remote from said face plate and a workpiece clamped between said rotor and said face plate; and means to selectively apply a fluid under pressure directly on one side of said flange for actuating said rotor element axially in a first direction for releasably clamping the workpieces individually and for applying said fluid under pressure directly on an opposite side of said flange for actuating said rotor element axially in an opposite direction to release the individual workpieces.

2. A centerless work-holding apparatus according to claim 1, in which said face plate has a through aperture through which said axis passes and dimensioned to allow a tool to pass therethrough for performing an operation on said workpieces individually while in a clamped condition.

3. A centerless work-holding apparatus according to claim 2, in which the workpieces are tubular and have an axial bore, and including a bore gage movable axially through the tubular rotor element for gaging the axial bore of the individual workpieces while in a clamped condition after performance of said operation.

* * * * *